United States Patent [19]
Hiller et al.

[11] 4,278,606
[45] Jul. 14, 1981

[54] PREPARATION OF 1-AMINO-2-PHENOXY-4-HYDROXYAN-THRAQUINONE

[75] Inventors: Heinrich Hiller, Wachenheim; Heinz Eilingsfeld, Frankenthal; Helmut Reinicke, Gruenstadt; Fritz Traub, Neustadt, all of Fed. Rep. of Germany

[73] Assignee: BASF Aktiengesellschaft, Fed. Rep. of Germany

[21] Appl. No.: 128,118

[22] Filed: Mar. 7, 1980

[30] Foreign Application Priority Data

Mar. 19, 1979 [DE] Fed. Rep. of Germany ....... 2910716

[51] Int. Cl.³ .............................................. C07C 97/26
[52] U.S. Cl. ................................................... 260/380
[58] Field of Search ......................................... 260/380

[56] References Cited
U.S. PATENT DOCUMENTS 3,704,252 11/1972 Bien et al. ............................. 260/380
3,822,992 7/1974 Hederich et al. ..................... 260/380

FOREIGN PATENT DOCUMENTS 1444761 2/1969 France .
1090259 11/1967 United Kingdom .
1411156 1/1969 United Kingdom .

OTHER PUBLICATIONS

Japanese Printed Application, 37432/1973 (English Abstract).
Zh. Prikl. Khim. 49, (1976), 4, pp. 904–905.

Primary Examiner—Patrick Garvin
Assistant Examiner—Raymond K. Covington
Attorney, Agent, or Firm—Oblon, Fisher, Spivak, McClelland & Maier

[57] ABSTRACT

In a process for the preparation of 1-amino-2-phenoxy-4-hydroxyanthraquinone by reacting 1-amino-2-halogeno-4-hydroxyanthraquinone with a phenol in an alkaline aqueous medium at an elevated temperature, the improvement that 1-amino-2-chloro-4-hydroxyanthraquinone is reacted in aqueous suspension, at a pH of from 9 to 13 and at from 120° to 150° C., with the phenol in the presence of (a) ammonium salts $N^{\oplus}(R)_4 A^{\ominus}$, wherein one or more R's are linear or branched $C_4$–$C_{20}$-alkyl or $C_7$–$C_{10}$-phenylalkyl and the remaining R or R's may also be phenyl or $N^{\oplus}(R)_3$ may be pyridinium, and $A^{\ominus}$ is one equivalent of an anion, of (b) ethylene oxide/propylene oxide block copolymers or of (c) oxyethylation products of alkylphenols, of alkenylamines, of alkylamines or of alkanols. A very pure product is obtained, in high yield.

11 Claims, No Drawings

PREPARATION OF 1-AMINO-2-PHENOXY-4-HYDROXYAN-THRAQUINONE

The present invention relates to a process for the preparation of 1-amino-2-phenoxy-4-hydroxyanthraquinone in an aqueous medium.

1-Amino-2-phenoxy-4-hydroxyanthraquinone is an important disperse dye for dyeing linear polyester fibers. The anthraquinone derivative is also an important intermediate for the preparation of other disperse dyes.

The preparation of 1-amino-2-phenoxy-4-hydroxyanthraquinone is described in numerous patents. For example, French Pat. No. 1,478,768, Example 3, describes the reaction of 1-amino-2-bromo-4-hydroxyanthraquinone, in phenol, with potassium carbonate at 120° C. In this reaction, phenol serves both as a reactant and as a solvent. French Pat. No. 1,477,434 and German Laid-Open Application DOS No. 1,444,761 mention carboxylic acid amides, eg. dimethylformamide as solvents, and Japanese Published Application No. 1971/325 mentions dimethylsulfoxide as a solvent, for the same reaction.

The processes which employ solvents have the disadvantage that on isolating the reaction product special measures must be taken to prevent pollution of the environment, and the solvents must be recovered from the filtrate. This entails additional costs.

Ya. B. Shteinberg and S. S. Tkachenko, Zh. Prikl. Khim. 49 (1976) 4, 904–905, describe a process for the preparation of 1-amino-2-phenoxy-4-hydroxyanthraquinone in an aqueous medium. In this process, 1-amino-2-bromo-4-hydroxyanthraquinone is reacted with phenol in aqueous potassium hydroxide solution in the presence of dispersants at 150° C. The authors claim yields of 87–90%. On repeating this process with various dispersants, we were unable to obtain a phenoxyanthraquinone derivative which could be used as a dye. In every case, the content of 1-amino-2-phenoxy-4-hydroxyanthraquinone in the products was less than 80%.

It is an object of the present invention to provide a process by means of which 1-amino-2-phenoxy-4-hydroxyanthraquinone can be prepared in an aqueous medium, in high yield and in the purity required for its use as a disperse dye. It is a further object of the invention to provide a process of this type which does not pollute the environment.

We have found that these objects are achieved and that 1-amino-2-phenoxy-4-hydroxyanthraquinone, where the phenoxy may be unsubstituted or substituted by chlorine, bromine, $C_1$–$C_4$-alkyl and/or $C_1$–$C_4$-alkoxy, is obtained by reacting a 1-amino-2-halo-4-hydroxyanthraquinone with the corresponding phenol in an aqueous alkaline medium if 1-amino-2-chloro-4-hydroxyanthraquinone, in the form of an aqueous suspension, is reacted with the phenol, at a pH of from 9 to 13 and at from 120° to 150° C., in the presence of a phase transfer catalyst, the latter consisting of (a) ammonium salts of the formula

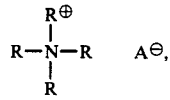

where one or more R's are linear or branched $C_4$–$C_{20}$-alkyl and/or $C_7$–$C_{10}$-phenylalkyl, the remaining R are $C_1$–$C_4$-alkyl, and one of the remaining R's may also be phenyl, or $R_3N^\oplus$— is pyridinium, and $A^\ominus$ is one equivalent of an anion, or (b) ethylene oxide/propylene oxide block copolymers which are obtained (α) by reacting hydroxy compounds of the general formula $A(OH)_m$ (II), where A is an m-valent aliphatic radical of 2 to 6 carbon atoms, OH is primary or secondary hydroxyl and m is from 2 to 4, with from 2 to 40 moles of propylene oxide per equivalent of hydroxyl and subsequent reaction with from 2 to 40 moles of ethylene oxide per equivalent of oxypropylation product, or (β) by reacting amines of the general formula

where R is saturated linear or branched $C_2$–$C_6$-alkylene, $R^1$ is hydrogen, methyl or phenyl and n is from 1 to 5, with from 2 to 40 moles of propylene oxide per equivalent of reactive amino hydrogen, followed by reaction with from 2 to 40 moles of ethylene oxide per equivalent of oxypropylation product, or (c) reaction products of $C_2$–$C_{20}$-alkylphenols, $C_{12}$–$C_{20}$-alkenylamines, $C_{12}$–$C_{20}$-alkylamines or $C_8$–$C_{20}$-alkanols with from 3 to 30 moles of ethylene oxide per mole of hydroxy compound or amino compound.

Using the process according to the invention, 1-amino-2-phenoxy-4-hydroxyanthraquinone is obtained in high yield and, at the same time, excellent quality. The product is very suitable for tinctorial purposes. The process gives yields of up to 98% of theory. The purity of the products is from 84% upward.

The process is carried out by heating the aqueous suspension, which contains the phase transfer catalyst, 1-amino-2-chloro-4-hydroxyanthraquinone and the phenol, and which has a pH of from 9 to 13, to 120°–150° C., whilst stirring, and keeping it at the desired temperature whilst maintaining the pH of the aqueous phase at from 9 to 13. After completion of the reaction, the mixture is cooled to 80°–90° C., then diluted with warm water to from 1.5 to 3 times its volume, and stirred at 50°–80° C. for a further 0.5–5 hours. The 1-amino-2-phenoxy-4-hydroxyanthraquinone is isolated from the suspension in a conventional manner, for example by filtering or centrifuging, and is washed with hot water until pale and neutral, and dried.

The pH of the suspension may be brought to the apropriate value by adding bases, eg. alkali metal hydroxides and alkali metal carbonates. Since the reaction consumes bases, it is necessary, when using an alkali metal hydroxide, to maintain the pH of the suspension at from 9 to 13 by further addition of sodium hydroxide solution or potassium hydroxide solution, either in small portions or continuously.

Advantageously, however, the pH is obtained by use of buffers, eg. sodium carbonate or preferably potassium carbonate, or potassium phosphate, the latter being a particularly suitable buffer. The amount of buffer may be chosen to be such that the pH remains within the desired range throughout the reaction. If smaller amounts of buffer are used, sodium hydroxide solution or potassium hydroxide solution is added to the suspension during the reaction. The reaction is preferably carried out at a pH of from 10 to 12, especially from 11 to 12.

The reaction temperature is from 120° to 150° C., preferably from 130° to 150° C. Below 120° C. long reaction times are required, because of the lower reaction rate, and therefore low space-time yields result. The reaction can also be carried out at above 150° C., but it is found that above 160° C. the product obtained is already substantially less good than that obtained at 140°–150° C.

Phenols which may be used are the same as those in the prior art processes, for example 2- and 4-chlorophenol, 4-bromophenol, 2-, 3- and 4-cresol, the xylenols, 4-ethylphenol, 4-isopropylphenol, 4-tert.-butylphenol and, preferably, phenol.

The molar ratio of phenol to 1-amino-2-chloro-4-hydroxyanthraquinone is at least 1:1, and preferably from 1:1.5 to 1:3. The amount of phenol required for optimum results depends on the purity of the 1-amino-2-chloro-4-hydroxyanthraquinone employed. If the 1-amino-2-chloro-4-hydroxyanthraquinone is not particularly pure, it is advantageous to employ from about 2.5 to 3 moles of phenol per mole of anthraquinone derivative.

To achieve rapid conversion, the reaction is advantageously carried out in the presence of dispersants, especially of anionic dispersants, eg. condensates of naphthalene-2-sulfonic acid and/or mono- or di-$C_1$-$C_8$-alkylnaphthalene-2-sulfonic acid with formaldehyde, or $C_4$-$C_{20}$-alkylbenzenesulfonic acid, in the form of the ammonium salts or alkali metal salts. The use of anionic dispersants is in particular advantageous if the 1-amino-2-chloro-4-hydroxyanthraquinone employed as the starting material is less than 95% pure. In such cases, the reaction gives a purer product in the presence of the anionic dispersant than in its absence. When using pure 1-amino-2-chloro-4-hydroxyanthraquinone, ie. if the purity of the latter is about 95% or more, the anionic dispersant is no longer necessary, but is also not disadvantageous. It is advantageous if the amount of anionic dispersant used is the greater, the less pure is the starting material. As a rule, from about 2 to 10, preferably from about 3 to 8, % by weight, based on 1-amino-2-chloro-4-hydroxyanthraquinone, of the anionic dispersant is employed.

It is essential to the invention that the reaction takes place in the presence of a phase transfer catalyst. These catalysts have the characteristic that they transform a reaction, taking place between a solid and a liquid phase, into a reaction taking place in a quasi-homogeneous phase.

Suitable phase transfer catalysts for the process according to the invention are:

(a) ammonium salts of the formula

where one or more R's are linear or branched $C_4$-$C_{20}$-alkyl and/or $C_7$-$C_{10}$-phenylalkyl, the remaining R's are $C_1$-$C_4$-alkyl, and one of the remaining R's may also be phenyl, or $R_3N^\oplus$— is pyridinium, and $A^\ominus$ is one equivalent of an anion, or (b) ethylene oxide/propylene oxide block copolymers which are obtained ($\alpha$) by reacting hydroxy compounds of the general formula $A(OH)_m$ (II), where A is an m-valent aliphatic radical of 2 to 6 carbon atoms, OH is primary or secondary hydroxyl and m is from 2 to 4, with from 2 to 40 moles of propylene oxide per equivalent of hydroxyl and subsequent reaction with from 2 to 40 moles of ethylene oxide per equivalent of oxypropylation product, or ($\beta$) by reacting amines of the general formula

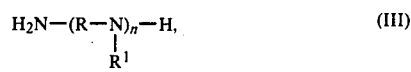

where R is saturated linear or branched $C_2$-$C_6$-alkylene, $R^1$ is hydrogen, methyl or phenyl and n is from 1 to 5, with from 2 to 40 moles of propylene oxide per equivalent of reactive amino hydrogen, followed by reaction with from 2 to 40 moles of ethylene oxide per equivalent of oxypropylation product, or (c) reaction products of $C_2$-$C_{20}$-alkylphenols, $C_{12}$-$C_{20}$-alkenylamines, $C_{12}$-$C_{20}$-alkylamines or $C_8$-$C_{20}$-alkanols with from 3 to 30 moles of ethylene oxide per mole of hydroxy compound or amino compound.

Specific examples of quaternary ammonium salts (a) are the following:

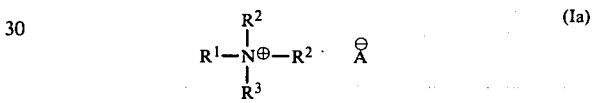

where $R^1$ is $C_4$-$C_{20}$-alkyl, preferably $C_8$-$C_{20}$-alkyl, and $R^2$ and $R^3$ are each $C_1$-$C_4$-alkyl, preferably methyl, or $R^1$ and $R^3$ are each $C_8$-$C_{20}$-alkyl and $R^2$ is $C_1$-$C_4$-alkyl, preferably methyl, or $R^1$ is $C_7$-$C_{10}$-phenylalkyl, $R^2$ is $C_1$-$C_4$-alkyl, preferably methyl, and $R^3$ is phenyl or $C_1$-$C_{20}$-alkyl, or $R^1$ is $C_8$-$C_{20}$-alkyl or $C_7$-$C_{10}$-phenylalkyl and

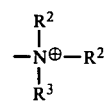

is pyridinium.

More specifically still, examples of cations (a) are: octadecyl-trimethylammonium, hexadecyl-trimethylammonium, tetradecyl-trimethylammonium, dodecyl-trimethylammonium, decyl-trimethylammonium and the ammonium ions which instead of trimethyl contain triethyl, tripropyl or tributyl; dioctadecyl-dimethylammonium, dihexadecyldimethylammonium, ditetradecyl-dimethylammonium, didodecyl-dimethylammonium, didecyl-dimethylammonium, dioctyldimethylammonium and the ammonium ions which instead of dimethyl contain diethyl, dipropyl or dibutyl; trimethylbenzylammonium, triethylbenzylammonium, tripropyl- and tributylbenzylammonium, tetra-n-butylammonium, cetyltrimethylammonium, cetyldimethylbenzylammonium, distearyldimethylammonium, lauryldimethylbenzylammonium, tris(oligo-oxyethyl)-$C_2$-$C_3$-alkyl-ammonium (=tri-($C_2$-$C_3$-alkanol)-amine reacted with ethylene oxide and quaternized with alkylating agents, eg. dimethyl sulfate, methyl benzenesulfonate or methyl toluenesulfonate), N-benzylpyridinium, N-hexadecylpyridinium, N-stearylpyridinium, N-octylpyridinium, tetradecylpyridinium, dodecylpyridinium and decylpyridinium.

Examples of catalysts from group (b) are:

(α) reaction products of ethylene glycol, propylene glycol, butane-1,2-, -1,3- and -1,4-diol, pentanediol and hexane-1,6-diol, glycerol, butanetriol, trimethylolpropane or pentaerythritol with from 2 to 40 moles of propylene oxide per equivalent of OH group and with from 2 to 40 moles of ethylene oxide (EO) per equivalent of oxypropylation product.

(β) Reaction products of diamines and polyamines of the formula (III), eg. ethylenediamine, diethylenetriamine, triethylenetetramine, N-(2-aminoethyl)-N-methylethylenediamine, propylenediamine, dipropylenetriamine, butylenediamine and hexamethylenediamine with from 2 to 40 moles of propylene oxide per equivalent of amino hydrogen and with from 2 to 40 moles of ethylene oxide per equivalent of oxypropylation product.

Specific examples of compounds of group (c) are oxyethylation products of oleylamine, stearylamine, octadecanol, hexadecanol, tetradecanol, dodecanol, a $C_9$-$C_{11}$-oxo-alcohol mixture, $C_{11}$-$C_{14}$-oxo-alcohol mixture or $C_{12}$-$C_{16}$-alkanol mixture with from 2 to 40 moles of ethylene oxide, and oxyethylation products of 4-ethylphenol, 4-sec.-butylphenol, 4-hexylphenol, 4-octylphenyl, 4-nonylphenol, 4-decylphenol, 4-dodecylphenyl, 4-tridecylphenol, 4-tetradecylphenol, 4-hexadecylphenol and 4-octadecylphenol with from 5 to 30 moles, preferably from 10 to 20 moles, of ethylene oxide per mole of phenol.

Reaction products of 4-nonylphenol with from 10 to 20 moles of ethylene oxide per mole of phenol and of 1 mole of propylene glycol with from 25 to 35 moles of propylene oxide and then with from 15 to 25 moles of ethylene oxide, trimethylbenzylammonium chloride, dimethylbenzylphenylammonium chloride, cetyltrimethylammonium chloride and corresponding ammonium salts with other anions are preferred as phase transfer catalysts.

Particularly preferred transfer catalysts for the process according to the invention are trimethylbenzylammonium salts and reaction products of 1 mole of 4-nonylphenol with from 12 to 17 moles of ethylene oxide.

The amount of transfer catalyst to be used depends on the purity of the 1-amino-2-chloro-4-hydroxyanthraquinone used as the starting material. The amount of (a), (b) and (c) is in general from 1 to 20% by weight, preferably from 1 to 10% by weight, based on 1-amino-2-chloro-4-hydroxyanthraquinone.

The purity of the product can be increased if the warm reaction mixture is poured out into warm dilute sodium carbonate solution and the resulting mixture is subsequently stirred whilst warm. The dilute sodium carbonate solution is an aqueous solution containing from 2 to 15, preferably from 5 to 10, especially from 7 to 10, percent by weight of sodium carbonate. The amount can be up to 3 times the amount of reaction mixture. Advantageously, from 0.75 to 1 volume is used per volume of reaction mixture.

A further purification effect is achieved if the aqueous suspension is circulated by pumping, whereby the sizable crystals of 1-amino-2-phenoxy-4-hydroxyanthraquinone are broken down. Milling pumps (®Gorator) have proved particularly suitable for this purpose.

The Examples which follow illustrate the process according to the invention. Parts and percentages are by weight.

EXAMPLE 1

91 parts of technical-grade 50% strength potassium hydroxide solution and 35 parts of technical-grade 75% strength phosphoric acid are dissolved in 200 parts of water, giving a pH of 11.5. 60 parts of phenol, 3.5 parts of a condensate of naphthalene-2-sulfonic acid and formaldehyde (in the form of the sodium salt) to act as a dispersant, 7 parts of a 50% strength aqueous solution of trimethylbenzylammonium chloride and 70 parts of 1-amino-2-chloro-4-hydroxyanthraquinone (88% pure, as determined by column chromatography/photometry) are then added and the suspension is heated for 15 hours at 140° C. and a pressure of 3.5 bar, whilst stirring. After the batch has finished reacting, it is cooled to 80°–90° C. and then poured into 350 parts of 10% strength sodium carbonate solution; the suspension is then stirred for 1 hour at 70° C. whilst being circulated by means of a milling pump. It is then filtered and the product is washed with hot water until pale and neutral, and is dried. 75.3 parts of 1-amino-2-phenoxy-4-hydroxyanthraquinone, which is 97% pure (as determined by column chromatography/photometry) are obtained; this corresponds to a yield of 98% of theory. Compared to a prior art product (obtained from 1-amino-2-bromo-4-hydroxyanthraquinone and phenolate in phenol as solvent), the product according to the invention gives purer and more yellow dyeings on polyester.

EXAMPLES 2 TO 13

The procedure described in Example 1 is followed, but instead of 3.5 parts of trimethylbenzylammonium chloride, 3.5 parts of one of the catalysts listed in the Table which follows are used. The product is obtained in the amount shown in column 3 and in the purity shown. Column 5 furthermore shows how the tinctorial properties compare with those of the prior art product.

TABLE

| Example | Catalyst | Yield Parts | Purity % | Hue in comparison to the prior art |
|---|---|---|---|---|
| 2 | Block polymer of p-nonylphenol with 14 moles of ethylene oxide | 72 | 95 | purer, more yellow |
| 3 | Cetyltrimethylammonium chloride | 76 | 88 | purer, more yellow |
| 4 | Distearyldimethylammonium chloride | 75 | 87 | similar |
| 5 | Dimethylbenzylphenylammonium chloride | 78 | 90 | purer, more yellow |
| 6 | Benzylpyridinium chloride | 77 | 84 | similar |
| 7 | Propylene glycol + 17 moles of PO + 3 moles of EO(+) | 77 | 88 | purer, more yellow |
| 8 | Propylene glycol + 30 moles of PO + 17 moles of EO(+) | 76 | 87 | purer, more yellow |
| 9 | Ethylenediamine + 17 moles of PO + 23 moles of EO(+) | 78 | 86 | purer, more yellow |
| 10 | Oleylamine + 12 moles of EO | 79 | 86 | purer, more yellow |
| 11 | Coconut fatty alcohol + 8 moles of EO | 77 | 85 | similar |
| 12 | $C_9$-$C_{11}$—oxo-alcohol + 5 moles of EO | 79 | 84 | similar |

TABLE-continued

| Example | Catalyst | Yield Parts | Purity % | Hue in comparison to the prior art |
|---|---|---|---|---|
| 13 | Propylene glycol + 31 moles of PO + 30 moles of EO(+) | 79 | 84 | similar |

EO = ethylene oxide
PO = propylene oxide
(+)The reaction was carried out in the sequence indicated

EXAMPLE 14

35 parts of potassium carbonate, 65 parts of p-chlorophenol, 4 parts of a 50% strength aqueous solution of diethanolamine dodecylbenzenesulfonate to act as a dispersant, 7 parts of a 50% strength aqueous solution of trimethylbenzylammonium chloride and 70 parts of 1-amino-2-chloro-4-hydroxyanthraquinone (95% pure) are introduced into 250 parts of water (resulting in a pH of 11), and the mixture is heated for 15 hours at 140° C., under a pressure of about 4.5 bar, whilst stirring. When it has cooled, the reaction mixture is poured into 350 parts of 10% strength sodium carbonate solution and the suspension is stirred for 1 hour at 70° C. and then filtered. The product is washed neutral and dried, giving 88 parts of 97% pure 1-amino-2-(4'-chlorophenoxy)-4-hydroxyanthraquinone, corresponding to a yield of 97% of theory.

For comparison, the Examples which follow show attempts to repeat the process of Shteinberg and Tkachenko:

COMPARATIVE EXAMPLE I

Repetition of the process described in Zh. Prikl. Khim. 49 (1976) 4, 904-05.

50 parts of 50% strength potassium hydroxide solution, 60 parts of phenol, 4 parts of a condensate of naphthalene-2-sulfonic acid and formaldehyde (in the form of the sodium salt), to act as a wetting agent, and 70 parts of 94% pure 1-amino-2-bromo-4-hydroxyanthraquinone, in 200 parts of water, are heated for 15 hours at 150° C. under a pressure of about 4.5 bar. After the reaction mixture has cooled to 80°-90° C., it is poured into 350 parts of 10% strength sodium carbonate solution and the suspension is stirred for 1 hour at 70° C., whilst circulating it by means of a milling pump; it is then filtered and the product is washed with hot water until pale and neutral, and is dried. 69 parts of a 79% pure product are obtained. This corresponds to a yield of 80% of theory. Polyester dyeings obtained with this product are very much duller and bluer than those obtained with the prior art product obtained from 1-amino-2-bromo-4-hydroxyanthraquinone and phenolate in phenol as solvent. The product is unsuitable for dyeing purposes. The product according to the invention gives much purer and very much yellower dyeings on polyester.

COMPARATIVE EXAMPLE II

The procedure followed is as described in Comparative Example I, except that the dispersant used consists of 4 parts of a 50% strength solution of diethanolamine dodecylbenzenesulfonate. Yield: 69 parts of 80% pure material. This product is again not usable for dyeing purposes.

COMPARATIVE EXAMPLE III

The procedure followed is as described in Example 1, but instead of 1-amino-2-chloro-4-hydroxyanthraquinone an equimolar amount (76 parts) of 94% pure 1-amino-2-bromo-4-hydroxyanthraquinone is used. 77 parts of 91% pure product are obtained, corresponding to a yield of 94% of theory. Surprisingly, in spite of its relatively high purity, the product gives very much duller and bluer dyeings than those obtained with the prior art product mentioned in Comparative Example I and is therefore not usable for dyeing purposes.

We claim:

1. In a process for the preparation of 1-amino-4-hydroxy-2-phenoxyanthraquinone, where the phenoxy is unsubstituted or substituted by one or two chlorine, bromine, $C_1$-$C_4$-alkyl or $C_1$-$C_4$-alkoxy, by reacting a 1-amino-2-halo-4-hydroxyanthraquinone with the corresponding phenol in an aqueous alkaline medium at an elevated temperature, the improvement comprising reacting 1-amino-2-chloro-4-hydroxyanthraquinone, in the form of an aqueous suspension, with the corresponding phenol,
at a pH of 9-13 and at from 120° to 150° C.,
in the presence of from 1 to 20% by weight, based on the 1-amino-2-chloro-4-hydroxyanthraquinone of:
(a) ammonium salts of the formula

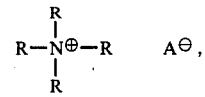

where one or more R's are linear or branched $C_4$-$C_{20}$-alkyl or $C_7$-$C_{10}$-phenylalkyl, the remaining R's are $C_1$-$C_4$-alkyl, and one of the remaining R's may also be phenyl, or $R_3N-\oplus$ is pyridinium, and $A^{\ominus}$ is one equivalent of an anion, or
(b) ethylene oxide/propylene oxide block copolymers which are obtained:
(α) by reacting hydroxy compounds of the formula $A(OH)_m$, where A is an m-valent aliphatic radical of 2 to 6 carbon atoms, OH is primary or secondary hydroxyl and m is 2 to 4, with from 2 to 40 moles of propylene oxide per equivalent of hydroxyl and subsequent reaction with from 2 to 40 moles of ethylene oxide per equivalent of oxypropylation product, or
(β) by reacting amines of the formula

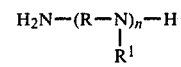

where R is saturated linear or branched $C_2$-$C_6$-alkylene, $R^1$ is hydrogen, methyl or phenyl and n is from 1 to 5, with from 2 to 40 moles propylene oxide per equivalent of reactive amino hydrogen, followed by reaction with from 2 to 40 moles of ethylene oxide per equivalent of oxypropylation product, or
(c) reaction products of $C_2$-$C_{20}$-alkylphenols, $C_{12}$-$C_{20}$-alkenylamines, $C_{12}$-$C_{20}$-alkylamines or $C_8$-$C_{20}$-alkanols with from 3 to 30 moles of ethylene oxide per mole of hydroxy compound or amino compound, and the reaction product is then isolated.

2. A process as claimed in claim 1, wherein the reaction is carried out in the presence of from 1 to 10% by weight, based on 1-amino-2-chloro-4-hydroxyanthraquinone, of (a), (b) or (c).

3. A process as claimed in claim 1 or 2, wherein the reaction is carried out at a pH of from 10 to 12.

4. A process as claimed in claim 1 or 2, wherein the reaction is carried out at from 130° to 150° C.

5. A process as claimed in claim 3, wherein the reaction is carried out at from 130° to 150° C.

6. A process as claimed in claim 1, wherein the reaction is carried out in the presence of an anionic dispersant.

7. A process as claimed in claim 6, wherein the anionic dispersant used is an alkali metal salt or ammonium salt of a condensate of naphthalene-2-sulfonic acid or of mono- or di-$C_1$-$C_8$-alkylnaphthalenesulfonic acid with formaldehyde, or of a $C_4$-$C_{20}$-alkylbenzenesulfonic acid.

8. A process as claimed in claim 1, wherein the reaction is carried out in the presence of (a) ammonium salts of the formula

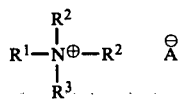

where $R^1$ is $C_4$-$C_{20}$-alkyl and $R^2$ and $R^3$ are each $C_1$-$C_4$-alkyl, or $R^1$ and $R^3$ are each $C_8$-$C_{20}$-alkyl and $R^2$ is $C_1$-$C_4$-alkyl, or $R^1$ is $C_7$-$C_{10}$-phenylalkyl, $R^2$ is $C_1$-$C_4$-alkyl and $R^3$ is phenyl or $C_1$-$C_{20}$-alkyl, or $R^1$ is $C_8$-$C_{20}$-alkyl or $C_7$-$C_{10}$-phenylalkyl and

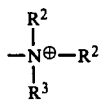

is pyridinium, or of (b) ethylene oxide/propylene oxide block copolymers which are obtained by reacting (α) ethylene glycol, propylene glycol, butane-1,2-, -1,3-or -1,4-diol, pentanediol, hexane-1,6-diol, glycerol, butanetriol, trimethylolpropane or pentaerythritol with from 2 to 40 moles of propylene oxide per equivalent of OH group and with from 2 to 40 moles of ethylene oxide per equivalent of oxypropylation product, or (β) ethylenediamine, diethylenetriamine, triethylenetetramine, N-(2-aminoethyl)-N-methylethylenediamine, propylenediamine, dipropylenetriamine, butylenediamine or hexamethylenediamine with from 2 to 40 moles of propylene oxide per equivalent of amino hydrogen and with from 2 to 40 moles of ethylene oxide per equivalent of oxypropylation product, or of (c) reaction products of oleylamine, stearylamine, octadecanol, hexadecanol, tetradecanol, dodecanol, a $C_9$-$C_{11}$-oxo-alcohol mixture, a $C_{11}$-$C_{14}$-oxo-alcohol mixture or a $C_{12}$-$C_{16}$-alkanol mixture with from 2 to 40 moles of ethylene oxide, or a reaction product of 4-ethylphenol, 4-sec.-butylphenyl, 4-hexylphenol, 4-octylphenol, 4-nonylphenol, 4-decylphenol, 4-dodecylphenol, 4-tridecylphenol, 4-tetradecylphenol, 4-hexadecylphenol or 4-octadecylphenol with from 5 to 30 moles of ethylene oxide per mole of phenol.

9. A process as claimed in claim 1, wherein the reaction is carried out in the presence of a reaction product of 4-nonylphenol with from 10 to 20 moles of ethylene oxide per mole of phenol or of 1 mole of propylene glycol with from 25 to 35 moles of propylene oxide and then with from 15 to 25 moles of ethylene oxide, or of trimethylbenzylammonium chloride, dimethylbenzylphenylammonium chloride, cetyltrimethylammonium chloride or corresponding ammonium salts with other anions.

10. A process as claimed in claim 1, wherein the reaction is carried out in the presence of a trimethylbenzylammonium salt or of a reaction product of 1 mole of p-nonylphenol with from 10 to 20 moles of ethylene oxide.

11. A process as claimed in claim 8, 9 or 10, wherein the reaction is carried out at a pH of from 10 to 12.

* * * * *